3,389,865
DYNAMOELECTRIC MACHINE CORE MEMBER TOOTH EXTENDER
Buddy S. Stuckey, Fort Wayne, Ind., assignor to Fort Wayne Tool & Die, Inc., Fort Wayne, Ind., a corporation of Indiana
Filed Sept. 3, 1965, Ser. No. 484,887
5 Claims. (Cl. 242—1.1)

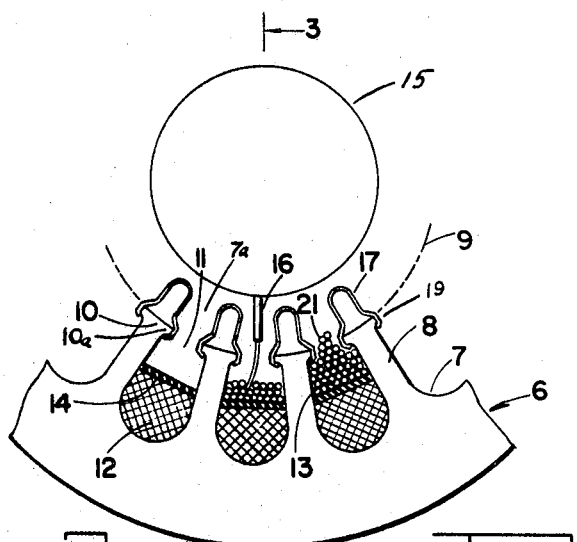
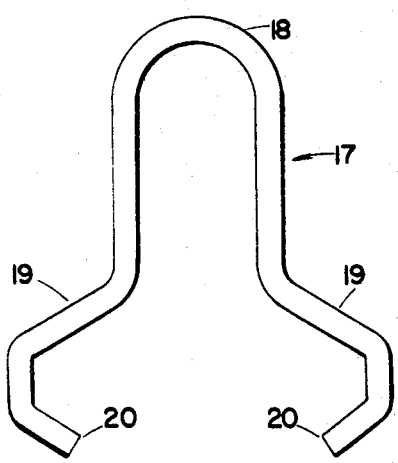
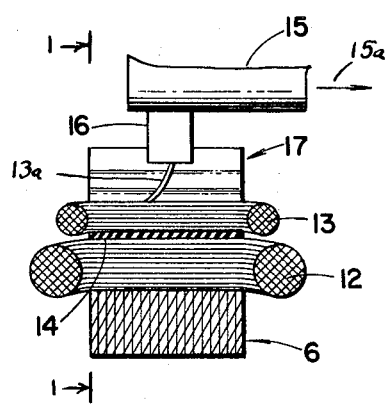
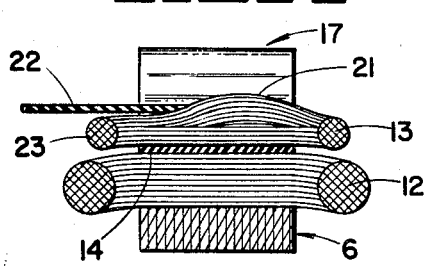
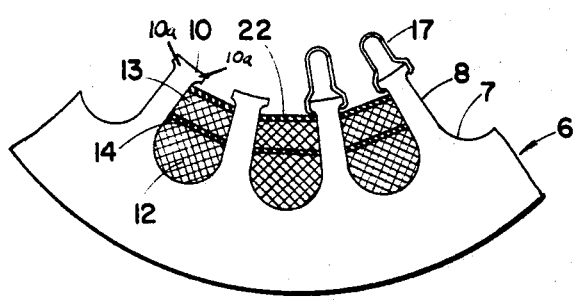
INVENTOR
BUDDY S. STUCKEY
BY Hood, Gust & Irish
ATTORNEYS

United States Patent Office 3,389,865
Patented June 25, 1968

ABSTRACT OF THE DISCLOSURE

An apparatus for use with gun type winding machines and dynamoelectric machine stator core members having a central bore and radially extending teeth and winding slots to extend the teeth radially into the bore during the winding operation. The tooth extending member has a generally U-shaped tooth extending portion having two generally flat surfaces joined at one end by a smoothly rounded bight portion which forms one end of the member. The tooth extending member has a clip portion extending from the flat surfaces away from the bight portion to form the other end of the member. The clip portion, in a specific embodiment, comprises strip material bent, adjacent to the flat surfaces, outwardly and away therefrom, and bent, remote from the flat surfaces, back toward each other. The clip portion functions to removably secure the member to a respective tooth and to prevent the unintentional removal of the member from the tooth during the winding operation and the insertion of slot wedges, and to allow their subsequent removal.

---

This invention relates generally to the machine winding of dynamoelectric machine stator core members with a gun type winding machine, and more particularly to a tooth extender for use during winding for extending the radial length of the teeth and thus the winding slots thereby to accommodate more wire.

The field windings of certain dynamoelectric machines, such as single phase alternating current motors, are conventionally wound in the slots of the stator core member with a gun type winding machine. A gun type winding machine commonly comprises a winding head having a wire dispensing needle extending outwardly therefrom, the head and needle being moved reciprocally through the bore of the core and oscillated at the respective ends of its stroke thereby to wind a coil in a pair of stator core slots.

The wire dispensing needle conventionally extends into and moves through the core slots during the winding operation thereby to ensure that the wire dispensed thereby is laid directly into the slots. However, with this arrangement, it has been impossible completely to fill the slots with wire, a desirable condition for optimum efficiency in certain dynamoelectric machine designs. While other types of winding machines will provide greater slot fill, gun type winding machines are frequently preferred by reason of their high speed operation. It is therefore desirable to provide means for use in conjunction with a gun type winding machine for securing greater slot fill than has heretofore been obtainable.

It is accordingly an object of the invention to provide tooling for use in conjunction with a gun type winding machine for obtaining greater slot fill during the winding of internally slotted dynamoelectric machine stator core members.

In accordance with the broader aspects of the invention, tooth extension members are provided respectively removably secured to the ends of adjacent stator core member teeth and extending radially inwardly therefrom into the bore so as to define extensions of the respective winding slots therebetween, the wire dispensing needle extending into and moving through these slot extensions during the winding operation rather than into the stator core slots themselves.

The above-mentioned and other features and objects of this invention and the manner of attaining them will become more apparent and the invention itself will be best understood by referenece to the following description of an embodiment of the invention taken in conjunction with the accompanying drawings, wherein:

FIG. 1 is a fragmentary end view, taken generally along the line 1—1 of FIG. 3, illustrating a dynamoelectric machine stator core member during winding by a gun type winding machine and having the tooth extension members of the invention assembled thereon;

FIG. 2 is an enlarged end view of the tooth extension member of the invention;

FIG. 3 is a fragmentary cross-sectional view taken along the line 3—3 of FIG. 1;

FIG. 4 is a fragmentary cross-sectional view similar to FIG. 3 but showing the action of the slot wedges following completion of the winding operation; and FIG. 5 is a fragmentary end view similar to FIG. 1 showing the core member after completion of the winding operation and wedging.

Referring now to the figures of the drawing, there is shown a conventional dynamoelectric machine stator core member 6 having a plurality of radially inwardly extending winding slots 7 formed therein respectively defined by radially inwardly extending teeth 8 having inner ends 10 which define the central bore 9. Tooth ends 10 respectively have side portions 10a respectively defining neck portions 11 of the slots 7 which communicate with the bore 9 and are respectively narrower than the radially outwardly extending portions of the slots.

The field coils for the dynamoelectric machine, which may be a single phase, alternating current motor having main or running windings 12 and auxiliary or starting windings 13 are wound into the slots 7 by conventional gun type winding machines having a winding head 15 with a wire dispensing needle 16 extending radially outwardly therefrom. The gun type winding machine may be of the type described and illustrated in Patent No. 3,025,008 of Richard G. Nill and Robert J. Eminger assigned to the assignee of the present application.

In FIG. 1, the main windings 12 are shown already wound in the slots 7 with conventional phase insulation 14 thereover, the present invention being particularly advantageous in connection with the winding of the start windings 13 which are conventionally wound over the main windings 12.

In accordance with the invention, a plurality of tooth extension members 17 are provided respectively formed of relatively thin-gauge spring metal, such as spring steel. Tooth extension members 17 are generally U-shaped in configuration having bight portions 18 and clip portions 19 formed adjacent ends 20 of their legs. In the specific embodiment illustrated in the drawings, members 17 comprise an elongated strip of spring metal having opposite ends 20 which are formed into the shape illustrated in FIG. 2. This strip is bent intermediate the ends 20 to form a smoothly rounded bend to form the bight portion 18 and two generally parallel portions extending from the bight portion 18 to the clip portions 19. Since the strip from which member 17 is formed has a uniform thickness and initially flat surfaces, these parallel portions have outwardly facing flat surfaces. Clip portions 19 are formed by bending the strip adjacent to the end of the flat surfaces remote from the bight portion 18 outwardly and away from the plane of the flat surface; and further, bending the strip remote from the flat surfaces back toward the other clip portion 19. Clip portions 19 have straight terminal portions adjacent to ends 20 which are angularly disposed to each other and which, if extended, would meet. By this means clip portions 19 are formed so as to conform to the shape of the ends 10 and side portions 10a of each tooth 8 of the core member 6. Also, the dimension of the member 17 measured generally perpendicularly between the generally outwardly facing flat surfaces of the afore-mentioned is smaller than the dimension, measured in the same direction, between the clip portions 19. Tooth extenders 17 are respectively assembled on the ends 10 of the stator core teeth 8 and extend radially inwardly into the bore 9, the clip portions 19 respectively resiliently engaging the side portions 10a of each tooth, as best seen in FIGS. 1 and 5.

It will now be seen that each adjacent pair of tooth extension members 17 respectively define an inwardly extending extension 7a of the respective winding slots 7.

As best seen in FIGS. 1 and 3, winding head 15 of the winding machine moves within the tooth extenders 17 with its wire dispensing needle 16 extending into and moving through the slot extensions 7a, but not extending through the neck portions 11 and actually into the slots 7, as has previously been the practice.

Referring now particularly to FIGS. 3 and 4, it will be seen that as the winding head 15 is moved in the direction shown by the arrow 15a, wire dispensing needle 16 will lay the wire 13a forming the start winding coil 13 in the respective slots 7 over the respective main winding coil 12 and phase insulator 14, the wire 13a being guided into the slot by the adjacent pair of tooth extenders 17. In this way the portion of the respective slots 7 over the main winding 12 and phase insulator 14 can be substantially filled with wire forming the start winding 13.

It will be understood that as the respective slot 7 is filled with the wire 13a forming the start winding 13, some of the radially inner turns will tend to bulge or spill radially inwardly through the neck portion 11 and into the bore 9, as shown at 21 in FIGS. 1 and 4. However, it will be observed that these turns 21 are still disposed between the adjacent pair of tooth extenders 17. These turns 21 are however forced back into the slots to form a tightly compacted winding 13 by insertion of the conventional slot wedges or top sticks 22, as shown in FIG. 4. It will be readily understood that the end turns 23 of the start winding 13 are formed radially outwardly away from the bore 19, for example by the shroud arrangement described and illustrated in the aforesaid Patent No. 3,025,008, thus permitting the slot wedge 22 initially to be inserted over the winding 13 and under the ends 20 of the adjacent pair of tooth extenders 17.

In winding the stator core member of a typical single phase, alternating current motor, the main windings 12 are first wound in conventional fashion, the stator core member is removed from the winding machine and the phase insulators 14 installed. The tooth extenders 17 are then clipped onto the respective tooth ends 10 and the partially wound stator core member is then again placed in the winding machine. The start windings 13 are then wound and the resultant fully wound stator core member removed from the winding machine. The slot wedges 22 are then installed and the tooth extenders 17 are then removed as the last step in the winding operation. FIG. 5 of the drawings shows a fully wound stator core member with the slot wedges 22 installed with the tooth extenders 17 removed from two of the teeth 8 and still remaining on two other teeth.

It will now be seen that with the employment of the tooth extenders of the invention, the wire dispensing needle need not extend into and move through the winding slots as has previously been the case, but may now merely extend into and move through the slot extensions defined by the tooth extenders so that the slots can be substantially filled with wire, the inner turns which spill into the bore being wedged back into the slots upon insertion of the conventional slot wedges. It will thus be seen that employment of the tooth extenders of the invention permits considerably greater slot fill than has heretofore been obtainable with a gun type winding machine.

While there have been described above the principles of this invention in connection with specific apparatus, it is to be clearly understood that this description is made only by way of example and not as a limitation to the scope of the invention.

What is claimed is:

1. In combination, a dynamoelectric machine stator core member having a plurality of radially inwardly extending teeth respectively defining winding slots therebetween, said teeth having inner ends defining a bore, and at least two tooth extension members respectively removably secured to the inner ends of two adjacent teeth and extending radially into said bore thereby defining an extension of the respective winding slot therebetween.

2. The combination of claim 1 wherein each of said members is formed of spring metal and has portions respectively resiliently engaging opposite sides of the respective tooth end.

3. The combination of claim 1 wherein each of said tooth ends has opposite side portions respectively defining a neck portion of the respective slot communicating with said bore which is narrower than the remainder of the slot, and wherein each of said members has portions respectively engaging said side portions of the respective tooth.

4. The combination of claim 3 wherein each of said members is formed of spring metal and is generally U-shaped with its bight portion extending into said bore and with the ends of its legs formed as clip portions respectively resiliently engaging said side portions of the respective tooth.

5. The combination of claim 1 wherein said members each include means for grasping a respective one of said tooth ends.

References Cited

UNITED STATES PATENTS 1,686,678  10/1928  Burke.
2,579,585  12/1951  Klinksiek _____ 242—1.1

BILLY S. TAYLOR, *Primary Examiner.*